US011964846B2

(12) United States Patent
Sudi et al.

(10) Patent No.: US 11,964,846 B2
(45) Date of Patent: Apr. 23, 2024

(54) ELEVATOR LOCATION DETERMINATION BASED ON CAR VIBRATIONS OR ACCELERATIONS

(71) Applicant: Otis Elevator Company, Farmington, CT (US)

(72) Inventors: Sandeep Sudi, Farmington, CT (US); Nikola Trcka, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1412 days.

(21) Appl. No.: 16/382,764

(22) Filed: Apr. 12, 2019

(65) Prior Publication Data

US 2020/0122964 A1 Apr. 23, 2020

Related U.S. Application Data

(60) Provisional application No. 62/748,794, filed on Oct. 22, 2018.

(51) Int. Cl.
*B66B 1/34* (2006.01)

(52) U.S. Cl.
CPC .................................. *B66B 1/3492* (2013.01)

(58) Field of Classification Search
CPC .... B66B 1/3492; B66B 5/0018; B66B 5/0087
See application file for complete search history.

(56) References Cited

U.S. PATENT DOCUMENTS 4,341,287 A 7/1982 Kuzunuki et al.
4,880,082 A 11/1989 Kahkipuro et al.
5,085,294 A 2/1992 Iwata
5,682,024 A 10/1997 Koopman, Jr. et al.
(Continued)

FOREIGN PATENT DOCUMENTS

CN 1827512 A 9/2006
CN 102471017 B 5/2012
(Continued)

OTHER PUBLICATIONS

Chinese Office Action for Application No. 201911005599.7; dated Dec. 14, 2020; 7 Pages.
(Continued)

*Primary Examiner* — Jeffrey Donels
(74) *Attorney, Agent, or Firm* — CANTOR COLBURN LLP

(57) ABSTRACT

A method of detecting a location of a conveyance apparatus within a conveyance system including: detecting a sync sensor along a path of a conveyance apparatus at a first point in time, the sync sensor being at a known location along the path of the conveyance apparatus; monitoring a first acceleration of the conveyance apparatus along a first axis from the first point in time to a second point in time; determining a first distance away from the sync sensor along the path of the conveyance apparatus in response to the first acceleration of the conveyance apparatus and a period of time between the first point in time and the second point in time; and determining a first location of the conveyance apparatus along the path of the conveyance apparatus in response to the known location of the sync sensor and the first distance away from the sync sensor.

15 Claims, 7 Drawing Sheets

(56) References Cited

U.S. PATENT DOCUMENTS

| | | | | |
|---|---|---|---|---|
| 7,077,244 | B2 | 7/2006 | Oh et al. | |
| 7,143,001 | B2 | 11/2006 | Karasek | |
| 7,540,357 | B2 | 6/2009 | Finn et al. | |
| 7,540,358 | B2 | 6/2009 | Okamoto et al. | |
| 7,597,176 | B2 | 10/2009 | Zaharia | |
| 7,699,143 | B2 | 4/2010 | Tschuemperlin et al. | |
| 7,938,233 | B2 | 5/2011 | Kunz | |
| 7,958,970 | B2 | 6/2011 | Ma et al. | |
| 8,123,003 | B2 | 2/2012 | Meri et al. | |
| 8,893,858 | B2 | 11/2014 | Shi et al. | |
| 9,033,114 | B2 | 5/2015 | Mizon | |
| 9,372,083 | B2 | 6/2016 | Kang et al. | |
| 9,950,899 | B2 | 4/2018 | Mattsson et al. | |
| 2005/0039987 | A1 | 2/2005 | Redden | |
| 2011/0168496 | A1 * | 7/2011 | Bunter | B66B 13/143 187/247 |
| 2012/0193169 | A1 * | 8/2012 | Mizon | B66B 1/3492 187/394 |
| 2016/0304313 | A1 | 10/2016 | Kinnari et al. | |
| 2017/0349399 | A1 | 12/2017 | Sonnenmoser et al. | |
| 2019/0002238 | A1 * | 1/2019 | Bogli | B66B 5/0087 |
| 2019/0382238 | A1 * | 12/2019 | Witczak | B66B 5/0018 |

FOREIGN PATENT DOCUMENTS

| | | | |
|---|---|---|---|
| CN | 102633173 | A | 10/2014 |
| CN | 106115389 | A | 11/2016 |
| EP | 3305704 | A1 | 4/2018 |
| JP | 2007223776 | A | 9/2007 |

OTHER PUBLICATIONS

European Search Report for Application No. 19204712.4; dated Aug. 28, 2020; 8 Pages.

* cited by examiner

ELEVATOR LOCATION DETERMINATION BASED ON CAR VIBRATIONS OR ACCELERATIONS

CROSS-REFERENCE TO RELATED APPLICATIONS

This application claims the benefit of U.S. Provisional Application No. 62/748,794 filed Oct. 22, 2018, which is incorporated herein by reference in its entirety.

BACKGROUND

The embodiments herein relate to the field of conveyance systems, and specifically to a method and apparatus for monitoring a conveyance system.

Conveyance systems, such as, for example, elevator systems, escalator systems, and moving walkways may require periodic monitoring to perform diagnostics, which typically requires a technician to be called and perform a manual inspection of the system in the field.

BRIEF SUMMARY

According to an embodiment, a method of detecting a location of a conveyance apparatus within a conveyance system is provided. The method including: detecting a sync sensor along a path of a conveyance apparatus at a first point in time, the sync sensor being at a known location along the path of the conveyance apparatus; monitoring a first acceleration of the conveyance apparatus along a first axis from the first point in time to a second point in time; determining a first distance away from the sync sensor along the path of the conveyance apparatus in response to the first acceleration of the conveyance apparatus and a period of time between the first point in time and the second point in time; and determining a first location of the conveyance apparatus along the path of the conveyance apparatus in response to the known location of the sync sensor and the first distance away from the sync sensor.

In addition to one or more of the features described herein, or as an alternative, further embodiments may include: monitoring a second acceleration of the conveyance apparatus along a first axis from the second point in time to a third point in time; determining a second distance away from the first location along the path of the conveyance apparatus in response to the second acceleration of the conveyance apparatus between the second point in time and the third point in time and a period of time between the second point in time and the third point in time; and determining a second location of the conveyance apparatus along the path of the conveyance apparatus in response to the first location and the second distance away from the first location.

In addition to one or more of the features described herein, or as an alternative, further embodiments may include: monitoring a third acceleration of the conveyance apparatus along a first axis from the third point in time to a fourth point in time; determining a third distance away from the second location along the path of the conveyance apparatus in response to the third acceleration of the conveyance apparatus between the third point in time and the fourth point in time and a period of time between the third point in time and the fourth point in time; and determining a third location of the conveyance apparatus along the path of the conveyance apparatus in response to the second location and the third distance away from the second location.

In addition to one or more of the features described herein, or as an alternative, further embodiments may include: detecting a sync sensor along the path of the conveyance apparatus at the third point in time; comparing the known location of the sync sensor to the second location of the conveyance apparatus; and adjusting the second location of the conveyance apparatus along the path in response to comparing the known location of the sync sensor to the second location of the conveyance apparatus.

In addition to one or more of the features described herein, or as an alternative, further embodiments may include that the first acceleration is used to determine whether the conveyance apparatus is moving in a first or a second direction.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the first axis is oriented about parallel to an elevator shaft of the elevator system in a direction of gravity.

According to another embodiment, a method of detecting a location of a conveyance apparatus within a conveyance system is provided The method including: detecting a sync sensor along a path of a conveyance apparatus parallel to a first axis, the sync sensor being at a known location along the path of the conveyance apparatus; monitoring vibratory signatures along a second axis of a conveyance apparatus of a conveyance system; comparing the vibratory signature along a second axis of a conveyance apparatus of a conveyance system to a vibratory signature of the commissioning run along the second axis; and determining a first location of the conveyance apparatus along the path of the conveyance apparatus in response to at least the vibratory signature along a second axis of a conveyance apparatus of a conveyance system and the vibratory signature of the commissioning run along the second axis.

In addition to one or more of the features described herein, or as an alternative, further embodiments may include that the first axis is oriented about parallel to an elevator shaft of the elevator system in a direction of gravity.

In addition to one or more of the features described herein, or as an alternative, further embodiments may include that the second axis is oriented about perpendicular to the first axis.

In addition to one or more of the features described herein, or as an alternative, further embodiments may include that the conveyance system is an elevator system and the conveyance apparatus is an elevator car, and wherein the second axis is about parallel to doors of the elevator car.

In addition to one or more of the features described herein, or as an alternative, further embodiments may include that the conveyance system is an elevator system and the conveyance apparatus is an elevator car, and wherein the second axis is about perpendicular to doors of the elevator car.

In addition to one or more of the features described herein, or as an alternative, further embodiments may include: monitoring vibratory signatures along a third axis of a conveyance apparatus of a conveyance system; comparing the vibratory signature along a third axis of a conveyance apparatus of a conveyance system to a vibratory signature of the commissioning run along the third axis; and confirming the first location of the conveyance apparatus along the path of the conveyance apparatus in response to the vibratory signature along a third axis of a conveyance apparatus of a conveyance system, the vibratory signature of the commissioning run along the second axis, the vibratory signature along a second axis of a conveyance apparatus of a conveyance system, and the vibratory signature of the commissioning run along the second axis.

In addition to one or more of the features described herein, or as an alternative, further embodiments may include that the conveyance system is an elevator system and the conveyance apparatus is an elevator car, wherein the first axis is oriented about parallel to an elevator shaft of the elevator system in a direction of gravity, and wherein the second axis is oriented about perpendicular to the first axis and about parallel to doors of the elevator car, and the third axis is about perpendicular to doors of the elevator car.

In addition to one or more of the features described herein, or as an alternative, further embodiments may include that the conveyance system is an elevator system and the conveyance apparatus is an elevator car, wherein the first axis is oriented about parallel to an elevator shaft of the elevator system in a direction of gravity, and wherein the third axis is oriented about perpendicular to the first axis and about parallel to doors of the elevator car, and the second axis is about perpendicular to doors of the elevator car.

According to another embodiment, a sensor system for monitoring a conveyance system is provided. The sensing apparatus comprising: a sync sensor located along a pathway of a conveyance apparatus of a conveyance system; an inertial measurement unit configured to detect the sync sensor and measure accelerations of the conveyance apparatus of the conveyance system along an X axis, a Y axis, and a Z axis; and a controller configured to analyze the accelerations and determine a position of the conveyance apparatus along the pathway.

In addition to one or more of the features described herein, or as an alternative, further embodiments may include that the controller is configured to determine the position of the conveyance apparatus along the pathway by monitoring the acceleration of the conveyance apparatus along the Z axis from the first point in time to a second point in time and determining a first distance away from the sync sensor along the path of the conveyance apparatus in response to the acceleration of the conveyance apparatus along the Z axis and a period of time between the first point in time and the second point in time.

In addition to one or more of the features described herein, or as an alternative, further embodiments may include that the controller is configured to determine the position of the conveyance apparatus along the pathway by determining vibratory signatures along at least one of the X axis and the Y axis in response to the accelerations and comparing the vibratory signature to a vibratory signature of a commissioning run along the second axis.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the inertial measurement unit is located on a header of the elevator car.

Technical effects of embodiments of the present disclosure include using a sensing apparatus to monitor accelerations of the conveyance apparatus as the conveyance apparatus moves through a path of a conveyance system, using a sync sensor to confirm initial location and follow-on locations periodically.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
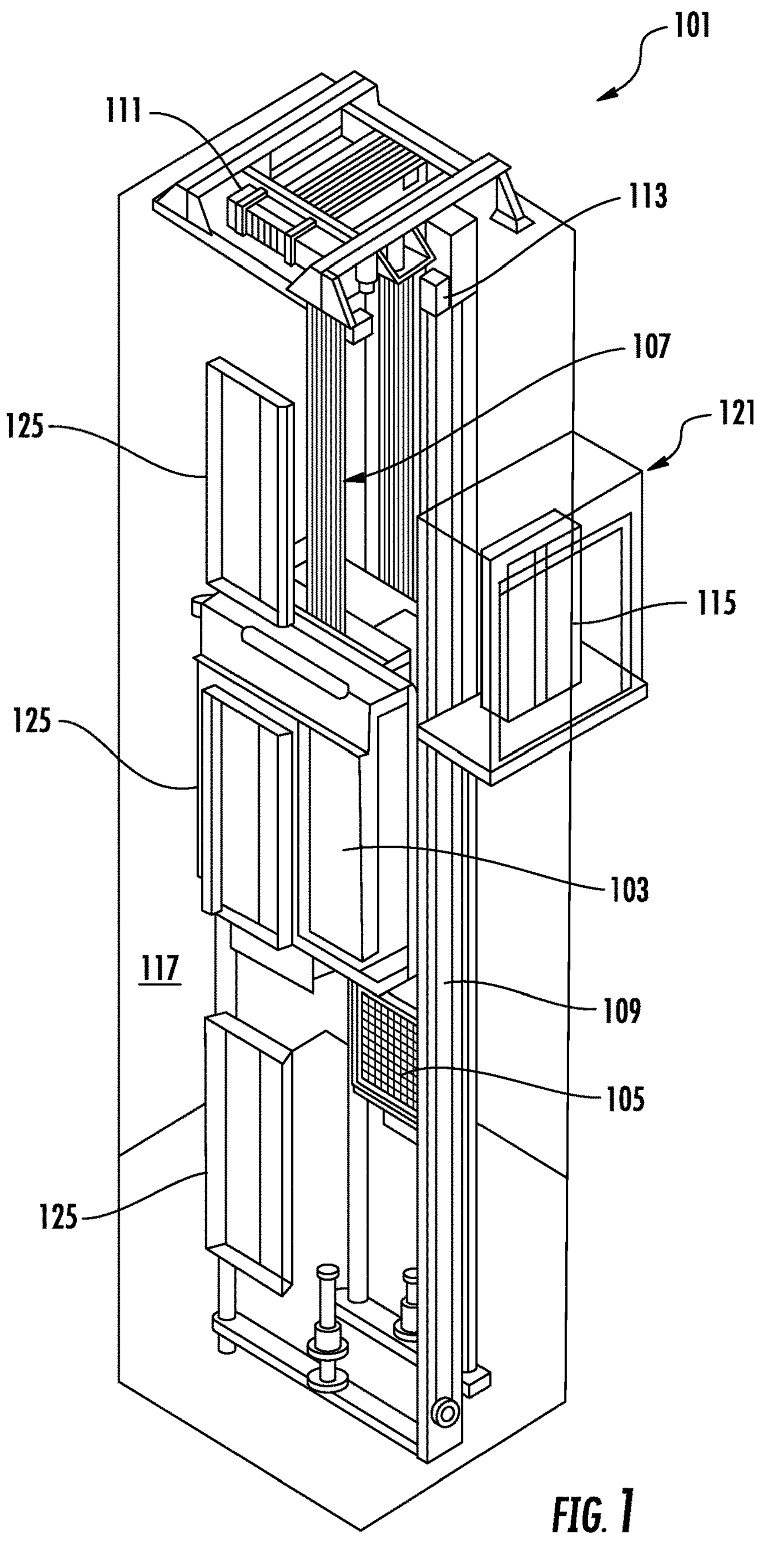
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Figures 2, 3:
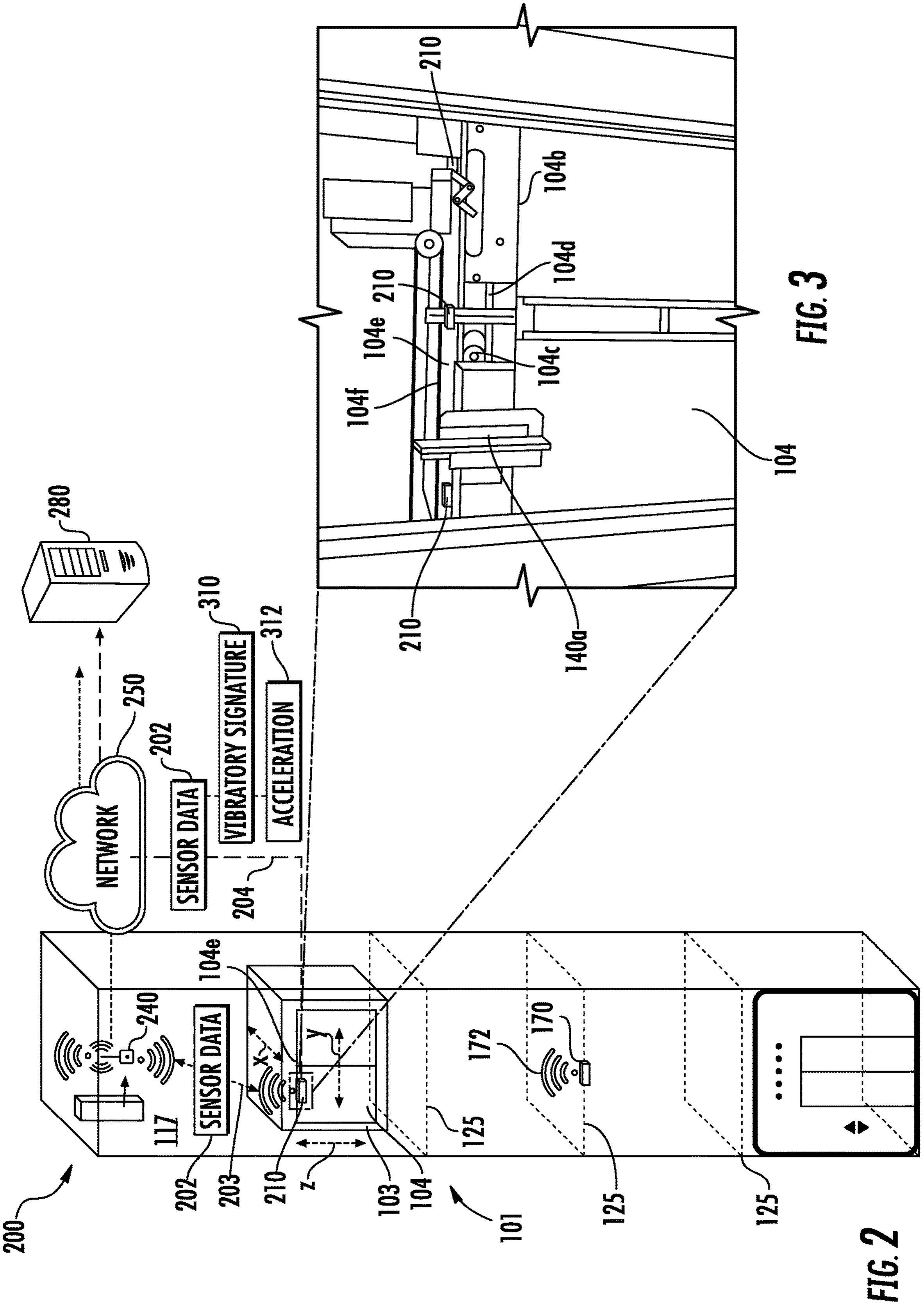
FIG. 2 is a schematic illustration of a sensor system for the elevator system of FIG. 1, in accordance with an embodiment of the disclosure.
FIG. 3 is a schematic illustration of the location of sensing apparatus of the sensor system of FIG. 2, in accordance with an embodiment of the disclosure.

FIG. 2 is a view of a sensor system 200 including a sensing apparatus 210, according to an embodiment of the present disclosure. The sensing apparatus 210 is configured to detect sensor data 202 of the elevator car 103 and transmit the sensor data 202 to a remote device 280. Sensing data 202 may include but is not limited to vibratory signatures 310 (i.e., vibrations over a period of time) or accelerations and derivatives or integrals of accelerations 312 of the elevator car 103, such as, for example, distance, velocity, jerk, jounce, snap . . . etc. Sensing data 202 may also include light, pressure, sound, humidity, and temperature, or any other desired data parameter. In an embodiment, the sensing apparatus 210 is configured to transmit sensor data 202 that is raw and unprocessed to the remote system 280 for processing. In an embodiment, the sensing apparatus 210 is configured to process the sensor data 202 prior to transmitting the sensor data 202 to the remote device 280. The processing of the sensor data 202 may reveal data, such as, for example, a number of elevator door openings/closings, elevator door time, vibrations, vibratory signatures, a number of elevator rides, elevator ride performance, elevator flight time, relative and absolute car position (e.g. elevation, floor number), releveling events, rollbacks, elevator car 103 x, y acceleration at a position: (i.e., rail topology), elevator car 103 x, y vibration signatures at a position: (i.e., rail topology), door performance at a landing number, nudging event, vandalism events, emergency stops, etc. The remote device 280 may be a computing device, such as, for example, a desktop or cloud computer. The remote device 280 may also be a mobile computing device that is typically carried by a person, such as, for example a smartphone, PDA, smartwatch, tablet, laptop, etc. The end user device 280 may also be two separate devices that are synced together, such as, for example, a cellular phone and a desktop computer synced over an internet connection. The remote device 280 may also be a cloud computing network.

The sensing apparatus 210 is configured to transmit the sensor data 202 to a remote device 280 via short-range wireless protocols 203 and/or long-range wireless protocols 204. Short-range wireless protocols 203 may include but are not limited to Bluetooth, Wi-Fi, HaLow (801.11ah), zWave, Zigbee, or Wireless M-Bus. Using short-range wireless protocols 203, the sensing apparatus 210 is configured to transmit the sensor data 202 to a local gateway device 240 and the local gateway device 240 is configured to transmit the sensor data 202 to a remote device 280 through a network 250. The network 250 may be a computing network, such as, for example, a cloud computing network, cellular network, or any other computing network known to one of skill in the art. Using long-range wireless protocols 204, the sensing apparatus 210 is configured to transmit the sensor data 202 to a remote device 280 through a network 250. Long-range wireless protocols 204 may include but are not limited to cellular, satellite, LTE (NB-IoT, CAT M1), LoRa, Satellite, Ingenu, or SigFox.

The sensing apparatus 210 is also configured to communicate with and/or detect the presence of a sync sensor 170 located at a particular location along the elevator shaft 117 (i.e., a path of the elevator car 103 or conveyance apparatus). Although only one sync sensor 170 is illustrated, one or more sync sensor 170 may be utilized in the sensor system 200. The sync sensor 170 may be located within the elevator shaft 117 or proximate the elevator shaft 117. The sync sensor 170 may be located at any location along the elevator shaft 117. The location of the sync sensor 170 along the elevator shaft 117 is known to the sensing apparatus 210 thus every time the sensing apparatus 210 detects being located proximate (or passing) the sync sensor 170, the sensing apparatus 210 knows exactly where the elevator car 103 may be along the elevator shaft 117. For example, if the sync sensor 170 is located at a fifth floor (i.e., fifth landing) then every time the sensing apparatus 210 detects the sync sensor 170, the sensing apparatus 210 may determine that the elevator car 103 is located at the fifth floor. Thus, when the sensing apparatus 210 detects passing the sync sensor 170, the current location of the elevator car 103 is recalibrated (i.e., zeroed) in the sensing apparatus 210. For example, when the sensing apparatus 210 detects passing the sync sensor 170 at the fifth floor, the current location of the elevator car 103 is recalibrated to be at the fifth floor and then the current location of the elevator car 103 may be determined by integrating the acceleration of the elevator car 103 away from the fifth floor over time to get a location within the elevator shaft 117. In one embodiment, the sync sensor 170 may be optional or omitted from the system.

The sync sensor 170 may be at least one of a magnet, an electromagnetic, a radio-frequency identification (RFID) tag, a Bluetooth transceiver, and a Wi-Fi transceiver, or any other desired similar device. The sync sensor 170 may utilize short range wireless signals 172 to communicate including but not limited to a magnetic field, RFID, Bluetooth, Wi-Fi, HaLow (801.11ah), zWave, Zigbee, or Wireless M-Bus. In one embodiment, there may be a sync sensor 170 at two or more landings 125 and the sync sensor 170 may be different types to differentiate between the two landings (e.g., one RFID and one magnetic field). Communication between the sensing apparatus 210 and the sync sensor 170 can be one-way or two-way communication. For example, one-way communication may be the sync sensor 170 emitting a short range wireless signals 172 and the sensing apparatus 210 detecting that short range wireless signals 172. In another example, two-way communication may be the sync sensor 170 emitting a short range wireless signals 172 and the sensing apparatus 210 detecting that short range wireless signals 172 and connecting to the sync sensor 170.

The sensing apparatus 210 may determine a distance to the sync sensor 170 by detecting a single strength of the short range wireless signal 172. In one example, if Bluetooth is utilized then the sync sensor 170 may advertise a Bluetooth signal and the sensing apparatus 210 may detect it. In another example, the sensing apparatus 210 may advertise a Bluetooth signal and the sync sensor 170 may receive it. In another example, there may be two-way Bluetooth communication between the sensing apparatus 210 and the sync sensor 170. In another example, the sync sensor 170 may be a Wi-Fi transceiver and the sensing apparatus 210 may detect the Wi-Fi beacon frame as part of the 802.11x protocol as well as the received signal strength of that beacon frame to approximate the distance between the Wi-Fi transceiver and the sensing apparatus 210 but not connect to the Wi-Fi signal. In another example, the sensing apparatus 210 may actively send a probe request looking for Wi-Fi transceivers, then a Wi-Fi transceiver (i.e. the sync sensor 170) may extract the MAC address of the mobile device 208 from the probe request and approximate distance between the Wi-Fi transceiver and the sensing apparatus 210 from received signal strength.

FIG. 2 shows a possible installation location of the sensing apparatus 210 within the elevator system 101. The sensing apparatus 210 may be hard and/or wirelessly connect to the controller 115 of the elevator system 101. In an embodiment, the sensing apparatus 210 may be attached to a door header 104*e* of a door 104 of the elevator car 103. Advantageously, by attaching the sensing apparatus 210 to the door header 104*e* of the elevator car 103 the sensing apparatus 210 may detect accelerations of the elevator car 103 and while being relatively isolated from vibrations from the doors 104 of the elevator car 103 when the doors 104 are not opening or closing. For example, when located on the door 104, the sensing apparatus 210 may detect when the elevator car 103 is in motion, when the elevator car 103 is slowing, when the elevator car 103 is stopping, and when the doors 104 open to allow passengers to exit and enter the elevator car 103 because when the doors 104 open and close the vibrations will be transferred to the header 104*e*. It is understood that the sensing apparatus 210 may also be installed in other locations other than the header 104*e* of the elevator system 101. In another embodiment, the sensing apparatus 210 is installed on a door 104 structure of the elevator car 103. In another embodiment, the sensing apparatus 210 is installed elsewhere on the elevator car 103. In one embodiment, separate door state sensors may be used. These door state sensors may be mounted on the landing door or car door. In one embodiment, the door state sensor may be an accelerometer, magnetic switch, read switch, proximity sensors, trigger switch, or any other desired known sensing device. The sensing apparatus 210 may be configured to detect sensor data 202 including acceleration in any number of directions. In an embodiment, the sensing apparatus 210 may detect sensor data 202 including accelerations 312 along three axis, an X axis, a Y axis, and a Z axis, as show in in FIG. 2. The X axis may be perpendicular to the doors 104 of the elevator car 103, as shown in FIG. 2. The Y axis may be parallel to the doors 104 of the elevator car 103, as shown in FIG. 2. The Z axis may be aligned vertically parallel with the elevator shaft 117 and pull of gravity, as shown in FIG. 2. Vibratory signatures may be generated along the X-axis and the Y-axis as the elevator car 103 moves along the Z-axis.

FIG. 3 is an enlarged view of multiple possible installation locations of the sensing apparatus 210 along the door header 104*e*. As shown in FIG. 3, the sensing apparatus 201 may be located on a door header 104*e* proximate a top portion 104*f* of the elevator car 103. The doors 104 are operably connected to the door header 104*e* through a door hanger 104*a* located proximate a top portion 104*b* of the door 104. The door hanger 104*a* includes guide wheels 104*c* that allow the door 104 to slide open and close along a guide rail 104*d* on the door header 104*e*.

Advantageously, the door header 104*e* is an easy to access area to attach the sensing apparatus 210 because the door header 104*e* is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door header 104*e* also provides ample clearance for the sensing apparatus 210 during operation of the elevator car 103, such as, for example, door 104 opening and closing.

Due to the mounting location of the sensing apparatus 210 on the door header 104*e*, sensing apparatus 210 may be able to detect door 104 open and close motions (i.e., acceleration) but not as clearly as a sensing apparatus 210 located on the door 104. However, advantageously, mounting the sensing apparatus 210 on the header 104*e* allows for clearer recording of a ride quality of the elevator car 103, which is equally important and would not be possible if the sensing apparatus 210 was mounted on the door 104 due to additional vibration of the door 104 during the elevator car 103 motion. Thus, by mounting the sensing apparatus 210 on the header 104*e* the sensing apparatus 210 is able to get clearer acceleration detections 312 along the X axis, the Y axis, and the Z axis from which vibratory signatures could be compiles in the X axis along the Z axis and the Y axis along the Z axis. It is understood that while two sensing apparatuses 210 are illustrated in FIG. 3, only one sensing apparatus 210 is required and two are illustrated to show two possible locations for the sensing apparatus 210

Figure 4:
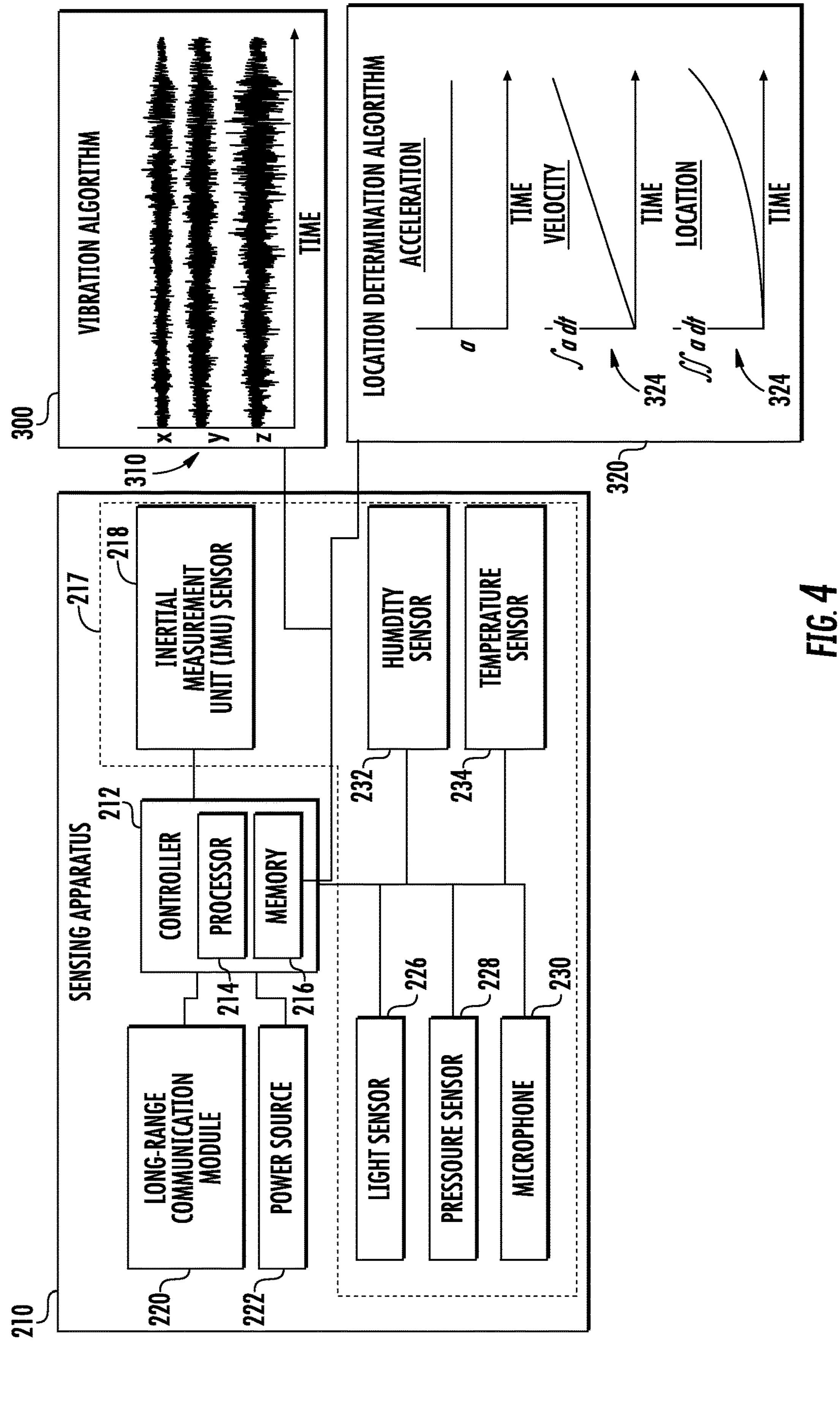
FIG. 4 is a schematic illustration of a sensing apparatus of the sensor system of FIG. 2, in accordance with an embodiment of the disclosure.

FIG. 4 illustrates a block diagram of the sensing apparatus 210 of the sensing system of FIG. 2. It should be appreciated that, although particular systems are separately defined in the schematic block diagram of FIG. 4, each or any of the systems may be otherwise combined or separated via hardware and/or software. As shown in FIG. 4, the sensing apparatus 210 may include a controller 212, a plurality of sensors 217 in communication with the controller 212, a communication module 220 in communication with the controller 212, and a power source 222 electrically connected to the controller 212.

The plurality of sensors 217 may include an inertial measurement unit (IMU) sensor 218 configured to detect sensor data 202 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The sensor data 202 detected by the IMU sensor 218 may include accelerations as well as derivatives or integrals of accelerations, such as, for example, velocity, jerk, jounce, snap . . . etc. The IMU sensor 218 is in communication with the controller 212 of the sensing apparatus 210.

The plurality of sensors 217 may also include additional sensors including but not limited to a light sensor 226, a pressure sensor 228, a microphone 230, a humidity sensor 232, and a temperature sensor 234. The light sensor 226 is configured to detect sensor data 202 including light exposure. The light sensor 226 is in communication with the controller 212. The pressure sensor 228 is configured to detect sensor data 202 including pressure levels. The pressure sensor 228 is in communication with the controller 212. The microphone 230 is configured to detect sensor data 202 including audible sound and sound levels. The microphone 230 is in communication with the controller 212. The humidity sensor 232 is configured to detect sensor data 202 including humidity levels. The humidity sensor 232 is in communication with the controller 212. The temperature sensor 234 is configured to detect sensor data 202 including temperature levels. The temperature sensor 234 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, processing the sensor data 202 collected by the IMU sensor 218, the light sensor 226, the pressure sensor 228, the microphone 230, the humidity sensor 232, and the temperature sensor 234. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art.

The sensing apparatus 210 includes a communication module 220 configured to allow the controller 212 of the sensing apparatus 210 to communicate with the remote device 280 through at least one of short-range wireless protocols 203 and long-range wireless protocols 204. The communication module 220 may be configured to communicate with the remote device 280 using short-range wireless protocols 203, such as, for example, Bluetooth, Wi-Fi, HaLow (801.11ah), Wireless M-Bus, zWave, Zigbee, or other short-range wireless protocol known to one of skill in the art. Using short-range wireless protocols 203, the communication module 220 is configured to transmit the sensor data 202 to a local gateway device 240 and the local gateway device 240 is configured to transmit the sensor data to a remote device 280 through a network 250, as described above. The communication module 220 may be configured to communicate with the remote device 280 using long-range wireless protocols 204, such as for example, cellular, LTE (NB-IoT, CAT M1), LoRa, Ingenu, SigFox, Satellite, or other long-range wireless protocol known to one of skill in the art. Using long-range wireless protocols 204, the communication module 220 is configured to transmit the sensor data 202 to a remote device 280 through a network 250. In an embodiment, the short-range wireless protocol 203 is sub GHz Wireless M-Bus. In another embodiment, the long-range wireless protocol is Sigfox. In another embodiment, the long-range wireless protocol is LTE NB-IoT or CAT M1 with 2G fallback.

The sensing apparatus 210 also includes a vibration algorithm 300 configured to analyze vibratory signatures 310 in multiple axis of the elevator car 103. The vibration signatures 310 may be the acceleration detected along one or more of the X axis, the Y axis, and the Z axis over a period of time or distance. The vibration algorithm 300 may be tangibly embodied within the memory 216 of the controller 212. The axis may include three axis such as the X axis, a Y axis, and a Z axis, as shown in FIG. 2. The sensing apparatus 210 when installed may be taken on a commissioning run where the elevator car 103 is conveyed across the entire length of the elevator shaft 117. During this commissioning run, the sensing apparatus 300 may record to the memory 216 a baseline vibrational signature along the X axis, a Y axis, and a Z axis. On subsequent elevator car 103 runs vibrational signatures that are currently measured along the X axis, Y axis, and the Z-axis will be compared to the baseline vibrational signatures collected during a commissioning run in order to determine where in the elevator shaft 117 the elevator car 103 is currently located.

The sensing apparatus 210 also includes a location determination algorithm 320 configured to determine a location of the elevator car 103 within the elevator shaft 117 (e.g., at what landing is the elevator car 103 located) in response to the acceleration of the elevator car 103 detected along the Y axis. The sensing apparatus 210 may detect an acceleration along the Y axis and may integrate the acceleration to get a velocity of the elevator car 103 at 322. At 324, the sensing apparatus 210 may also integrate the velocity of the elevator car 103 to determine location of the elevator car 103 within the elevator shaft 117 having known the starting location of the elevator car 103 prior to the acceleration along the Y axis using the sync sensor 170. Alternatively, the location determination algorithm 320 may keep a record of a historical time period it takes to travel between one or more floors and estimate a location in response to the current time period traveled. The acceleration of the elevator car 103 detected along the Y axis may be used to determine whether the elevator car 103 is moving upwards or downwards in the elevator shaft 117. This direction information combined with the current time period traveled may be used to estimate a location of the elevator car 103.

Figure 5:
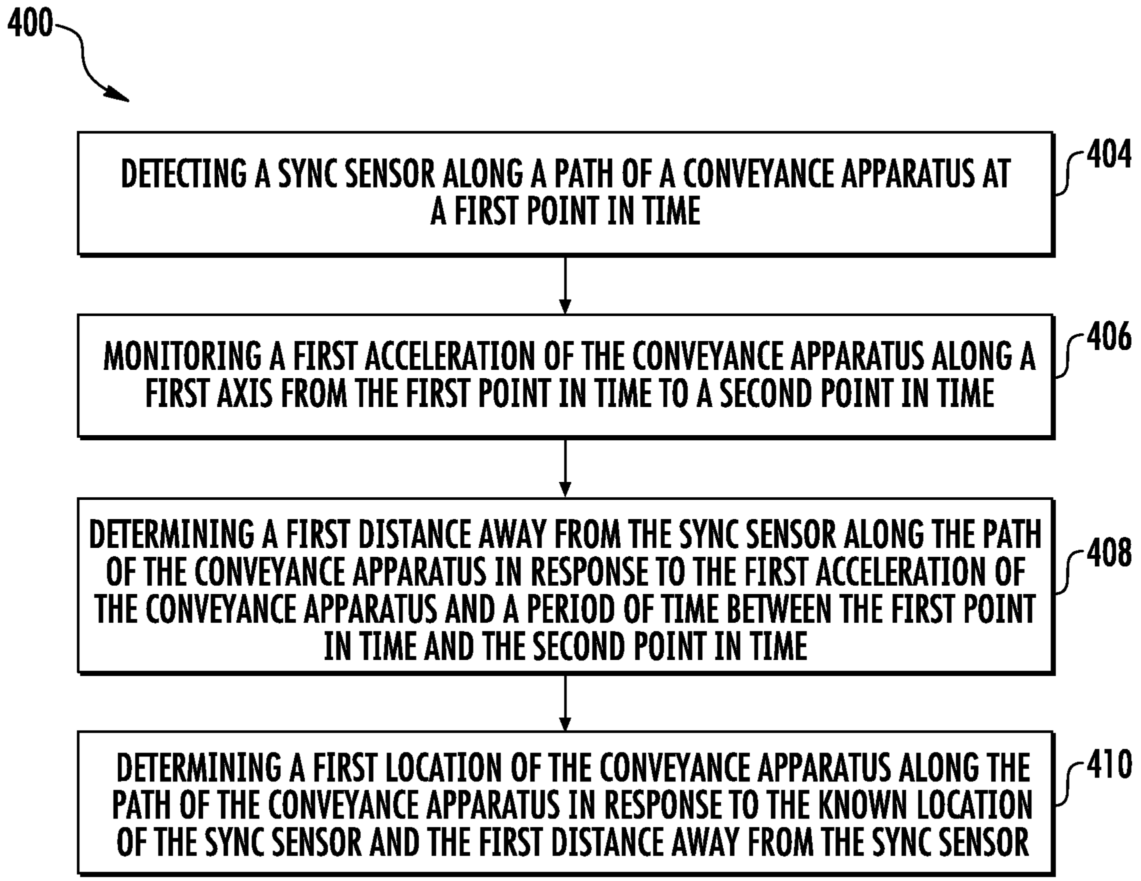
FIG. 5 is a flow chart of a method of detecting a location of a conveyance apparatus within a conveyance system, in accordance with an embodiment of the disclosure.
Figure 6:
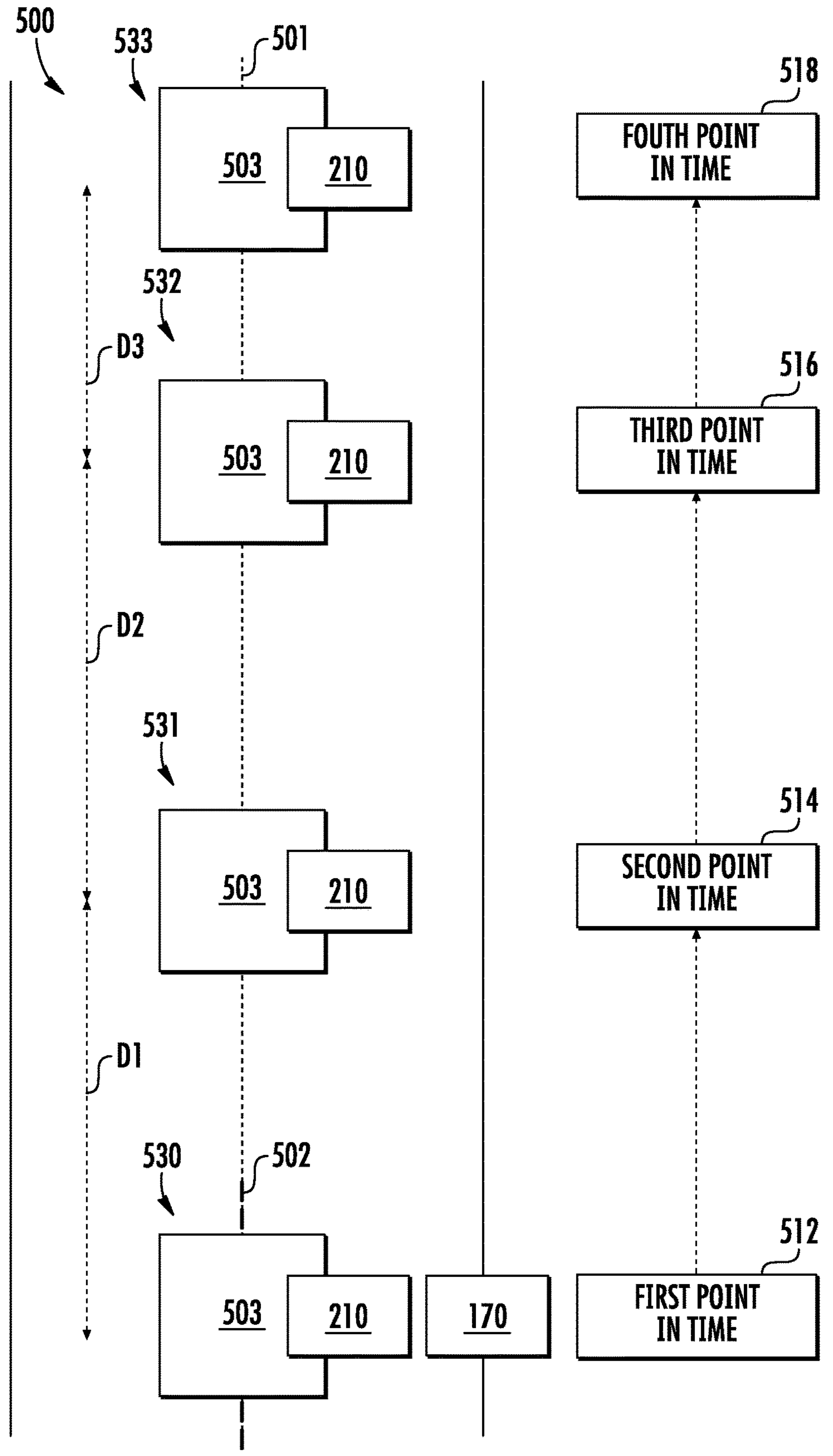
FIG. 6 illustrates a timeline of the method of FIG. 4, in accordance with an embodiment of the disclosure.

Referring now to FIGS. 5-6, while referencing components of FIGS. 1-3. FIG. 5 shows a flow chart of a method 400 of detecting a location of a conveyance apparatus 503 within a conveyance system 500, in accordance with an embodiment of the disclosure. In an embodiment, the conveyance system 500 is an elevator system and the conveyance apparatus 503 is an elevator car.

At block 404, a sync sensor 170 is detected along a path 501 of a conveyance apparatus 503 at a first point in time 512. The sync sensor 170 is at a known location 530 along the path 501 of the conveyance apparatus 503, thus when the sync sensor 170 is detected by the sensing apparatus 210 the sensing apparatus knows the location of the conveyance apparatus 503 along the path 501. The first axis 501 may oriented about parallel to an elevator shaft 117 of the elevator system in a direction of gravity. The first axis 502 may be the Z axis of FIG. 2. At block 406, a first acceleration of the conveyance apparatus 503 along a first axis 502 is monitored from the first point in time 512 to a second point in time 514. At block 408 a first distance D1 away from the sync sensor 170 along the path 501 of the conveyance apparatus 503 is calculated in response to the first acceleration of the conveyance apparatus 503 and a period of time between the first point in time 512 and the second point in time 514. At block 410, a first location 531 of the conveyance apparatus 503 along the path 501 of the conveyance apparatus 503 is calculated in response to the known location 530 of the sync sensor 170 and the first distance D1 away from the sync sensor 170. At block 408, the method 400 determines a distances away from the sync sensor 170 and then at block 410 the method 400 determines the location of the conveyances apparatus 503 in the conveyance system 500 using the known location of the sync sensor 170. In other words, once the distance away from the sync sensor 170 is determined, then the method 400 at block 410 locates the conveyance apparatus 503 within the frame of reference of the conveyance system 500.

The method 400 may further include: monitoring a second acceleration of the conveyance apparatus 503 along a first axis 501 from the second point in time 514 to a third point in time 516; determining a second distance D2 away from the first location 531 along the path 501 of the conveyance apparatus 503 in response to the second acceleration of the conveyance apparatus 503 between the second point in time 514 and the third point in time 516 and a period of time between the second point in time 514 and the third point in time 516; and determining a second location 532 of the conveyance apparatus 503 along the path 501 of the conveyance apparatus 503 in response to the first location 531 and the second distance D2 away from the first location 531.

Additionally, the method 400 may further comprise: monitoring a third acceleration of the conveyance apparatus 503 along a first axis 501 from the third point in time 516 to a fourth point in time 516; determining a third distance D3 away from the second location 532 along the path 501 of the conveyance apparatus 503 in response to the third acceleration of the conveyance apparatus 503 between the third point in time 516 and the fourth point in time 516 and a period of time between the third point in time 516 and the fourth point in time 516; and determining a third location 533 of the conveyance apparatus 503 along the path 501 of the conveyance apparatus 503 in response to the second location 532 and the third distance D3 away from the second location 532.

Alternatively, after the first location 531 the conveyance apparatus 503 may head in the opposite direction as shown in FIG. 5 and back to the known location 530. Thus, the method 400 may further comprise: detecting a sync sensor 170 along the path 501 of the conveyance apparatus 503 at the third point in time 516; and comparing the known location 530 of the sync sensor 170 to the second location 532 of the conveyance apparatus 503; and adjusting the second location of the conveyance apparatus 503 along the path 501 in response to comparing the known location 530 of the sync sensor 170 to the second location 532 of the conveyance apparatus 503.

While the above description has described the flow process of FIG. 5 in a particular order, it should be appreciated that unless otherwise specifically required in the attached claims that the ordering of the steps may be varied.

Figure 7:
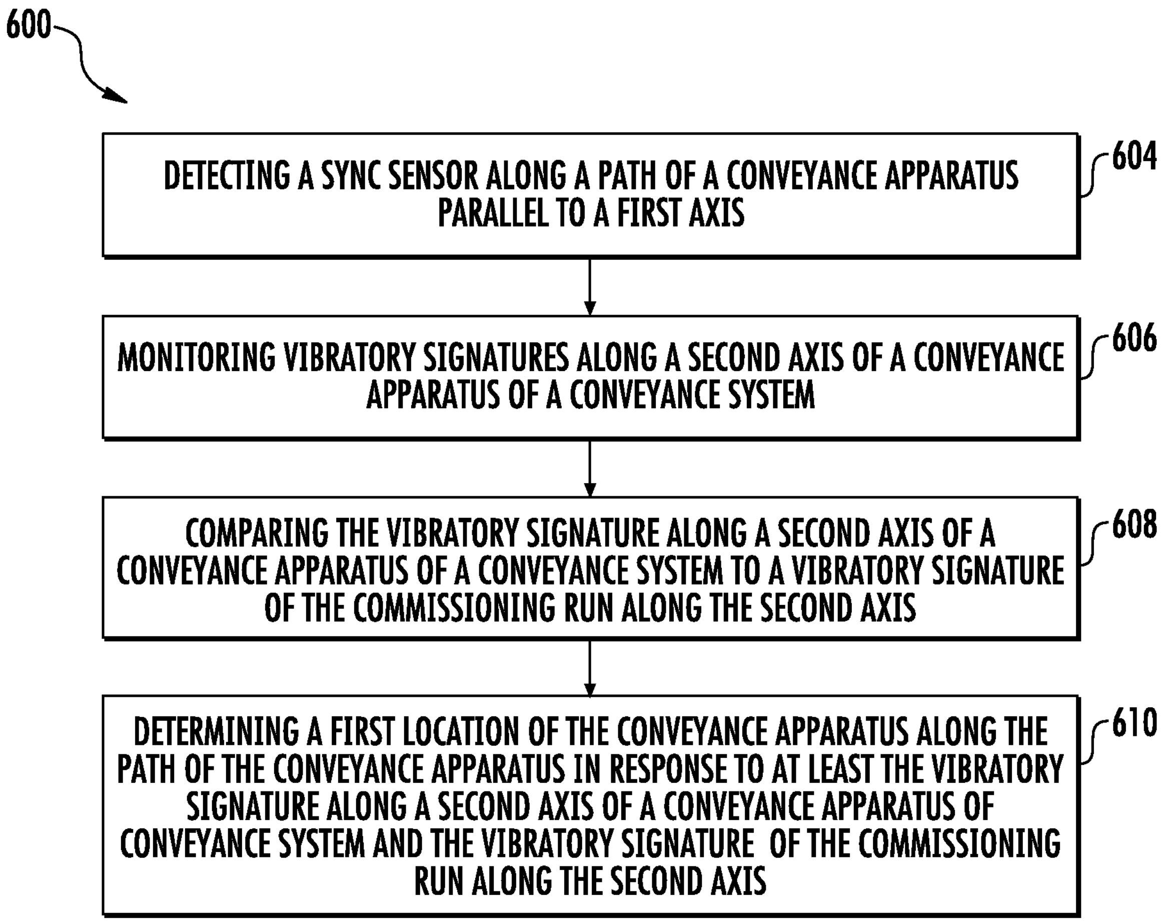
FIG. 7 is a flow chart of a method of detecting a location of a conveyance apparatus within a conveyance system, in accordance with an embodiment of the disclosure.
Figure 8:
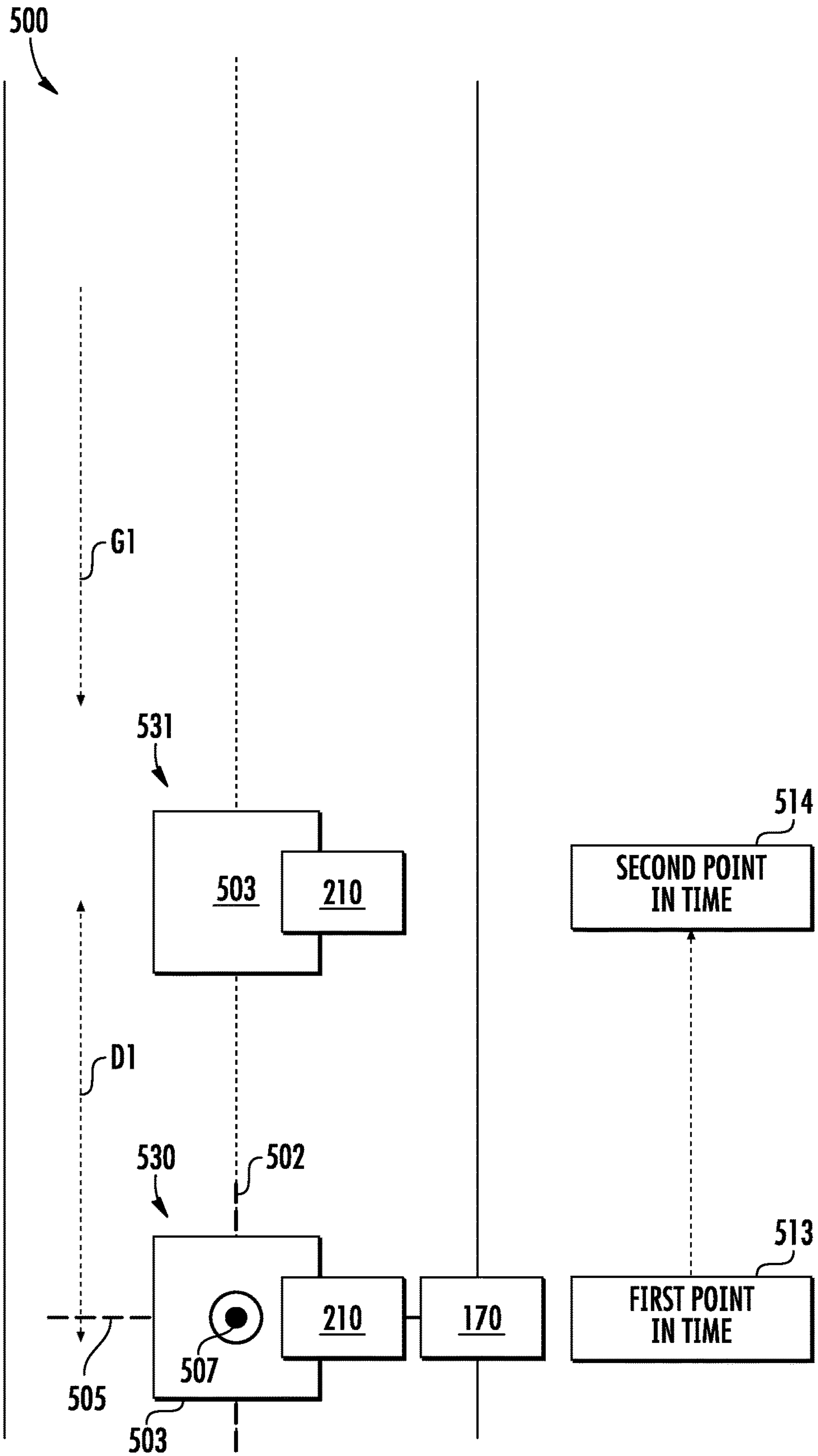
FIG. 8 illustrates a timeline of the method of FIG. 4, in accordance with an embodiment of the disclosure.

Referring now to FIGS. 7-8, while referencing components of FIGS. 1-4. FIG. 7 shows a flow chart of a method 600 of detecting a location of a conveyance apparatus 503 within a conveyance system 500, in accordance with an embodiment of the disclosure. In an embodiment, the conveyance system 500 is an elevator system and the conveyance apparatus 503 is an elevator car.

At block 604, a sync sensor 210 is detected along a path 501 of a conveyance apparatus 503 parallel to a first axis 502, the sync sensor 210 being at a known location 530 along the path 501 of the conveyance apparatus 503. At block 606, vibratory signatures 310 are monitored along a second axis 505 of a conveyance apparatus 503 of a conveyance system 500. At block 608, the vibratory signature 310 along a second axis 505 of a conveyance apparatus 503 of a conveyance system 500 is compared to a vibratory signature 310 of the commissioning run along the second axis 505. At block 610, a first location 531 of the conveyance apparatus 503 is determined along the path 501 of the conveyance apparatus 503 in response to at least the vibratory signature 310 along a second axis 505 of a conveyance apparatus 503 of a conveyance system 500 and the vibratory signature 310 of the commissioning run along the second axis 505.

In the embodiment where the conveyance system 500 is an elevator system 101 the first axis 505 is oriented about parallel to an elevator shaft 117 of the elevator system in a direction of gravity G1. In the embodiment where the conveyance system 500 is an elevator system 101 the second axis 505 is oriented about perpendicular to the first axis 505. The second axis 505 is about parallel to doors 104 of the elevator car 103. The second axis 505 may be the Y axis of FIG. 2 and the first axis is the Z axis of FIG. 2. Alternatively, the second axis 505 may be about perpendicular to doors 104 of the elevator car 103, thus second axis 505 may be the X axis of FIG. 2 and the first axis 502 is the Z axis of FIG. 2.

The method 600, may further comprise: monitoring vibratory signatures 310 along a third axis 507 of a conveyance apparatus 503 of a conveyance system 500; comparing the vibratory signature 310 along a third axis 507 of a conveyance apparatus 503 of a conveyance system 500 to a vibratory signature 310 of the commissioning run along the third axis 507; and confirming the first location 531 of the conveyance apparatus 503 along the path 501 of the conveyance apparatus 503 in response to the vibratory signature 310 along a third axis 507 of a conveyance apparatus 503 of a conveyance system 500, the vibratory signature 310 of the commissioning run along the second axis 505, the vibratory signature 310 along a second axis 505 of a conveyance apparatus 503 of a conveyance system 500, and the vibratory signature 310 of the commissioning run along the second axis 505.

While the above description has described the flow process of FIG. 7 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of detecting a location of a conveyance apparatus within a conveyance system, the method comprising:

detecting a sync sensor along a path of a conveyance apparatus at a first point in time, the sync sensor being at a known location along the path of the conveyance apparatus;

monitoring a first acceleration of the conveyance apparatus along a first axis from the first point in time to a second point in time;

determining a first distance away from the sync sensor along the path of the conveyance apparatus in response to the first acceleration of the conveyance apparatus and a period of time between the first point in time and the second point in time;

determining a first location of the conveyance apparatus along the path of the conveyance apparatus in response to the known location of the sync sensor and the first distance away from the sync sensor:

monitoring a second acceleration of the conveyance apparatus along a first axis from the second point in time to a third point in time;

determining a second distance away from the first location along the path of the conveyance apparatus in response to the second acceleration of the conveyance apparatus between the second point in time and the third point in time and a period of time between the second point in time and the third point in time; and determining a second location of the conveyance apparatus along the path of the conveyance apparatus in response to the first location and the second distance away from the first location.

2. The method of claim 1, further comprising:

monitoring a third acceleration of the conveyance apparatus along a first axis from the third point in time to a fourth point in time;

determining a third distance away from the second location along the path of the conveyance apparatus in response to the third acceleration of the conveyance apparatus between the third point in time and the fourth point in time and a period of time between the third point in time and the fourth point in time; and determining a third location of the conveyance apparatus along the path of the conveyance apparatus in response to the second location and the third distance away from the second location.

3. The method of claim 1, further comprising:

detecting a sync sensor along the path of the conveyance apparatus at the third point in time;

comparing the known location of the sync sensor to the second location of the conveyance apparatus; and adjusting the second location of the conveyance apparatus along the path in response to comparing the known location of the sync sensor to the second location of the conveyance apparatus.

4. The method of claim 1, wherein the first acceleration is used to determine whether the conveyance apparatus is moving in a first or a second direction.

5. The method of claim 1, wherein the conveyance system is an elevator system and the conveyance apparatus is an elevator car.

6. The method of claim 5, wherein the first axis is oriented about parallel to an elevator shaft of the elevator system in a direction of gravity.

7. A method of detecting a location of a conveyance apparatus within a conveyance system, the method comprising:

detecting a sync sensor along a path of a conveyance apparatus parallel to a first axis, the sync sensor being at a known location along the path of the conveyance apparatus;

monitoring vibratory signatures along a second axis of a conveyance apparatus of a conveyance system;

comparing the vibratory signature along a second axis of a conveyance apparatus of a conveyance system to a vibratory signature of the commissioning run along the second axis; and determining a first location of the conveyance apparatus along the path of the conveyance apparatus in response to at least the vibratory signature along a second axis of a conveyance apparatus of a conveyance system and the vibratory signature of the commissioning run along the second axis;

wherein the first axis is oriented about parallel to an elevator shaft of the elevator system in a direction of gravity;

wherein the second axis is oriented about perpendicular to the first axis;

wherein the conveyance system is an elevator system and the conveyance apparatus is an elevator car, and wherein the second axis is about perpendicular to doors of the elevator car.

8. The method of claim 7, wherein the conveyance system is an elevator system and the conveyance apparatus is an elevator car, and wherein the second axis is about parallel to doors of the elevator car.

9. The method of claim 7, further comprising:

monitoring vibratory signatures along a third axis of a conveyance apparatus of a conveyance system;

comparing the vibratory signature along a third axis of a conveyance apparatus of a conveyance system to a vibratory signature of the commissioning run along the third axis; and confirming the first location of the conveyance apparatus along the path of the conveyance apparatus in response to the vibratory signature along a third axis of a conveyance apparatus of a conveyance system, the vibratory signature of the commissioning run along the second axis, the vibratory signature along a second axis of a conveyance apparatus of a conveyance system, and the vibratory signature of the commissioning run along the second axis.

10. The method of claim 9, wherein the conveyance system is an elevator system and the conveyance apparatus is an elevator car, wherein the first axis is oriented about parallel to an elevator shaft of the elevator system in a direction of gravity, and wherein the second axis is oriented about perpendicular to the first axis and about parallel to doors of the elevator car, and the third axis is about perpendicular to doors of the elevator car.

11. The method of claim 9, wherein the conveyance system is an elevator system and the conveyance apparatus is an elevator car, wherein the first axis is oriented about parallel to an elevator shaft of the elevator system in a direction of gravity, and wherein the third axis is oriented about perpendicular to the first axis and about parallel to doors of the elevator car, and the second axis is about perpendicular to doors of the elevator car.

12. A sensor system for monitoring a conveyance system, the sensing apparatus comprising:

a sync sensor located along a pathway of a conveyance apparatus of a conveyance system;

an inertial measurement unit configured to detect the sync sensor and measure accelerations of the conveyance apparatus of the conveyance system along an X axis, a Y axis, and a Z axis; and a controller configured to analyze the accelerations and determine a position of the conveyance apparatus along the pathway;

wherein the controller is configured to determine the position of the conveyance apparatus along the pathway by monitoring the acceleration of the conveyance apparatus along the Z axis from the first point in time to a second point in time and determining a first distance away from the sync sensor along the path of the conveyance apparatus in response to the acceleration of the conveyance apparatus along the Z axis and a period of time between the first point in time and the second point in time.

13. A sensor system for monitoring a conveyance system, the sensing apparatus comprising:

a sync sensor located along a pathway of a conveyance apparatus of a conveyance system;

an inertial measurement unit configured to detect the sync sensor and measure accelerations of the conveyance apparatus of the conveyance system along an X axis, a Y axis, and a Z axis; and a controller configured to analyze the accelerations and determine a position of the conveyance apparatus along the pathway;

wherein the controller is configured to determine the position of the conveyance apparatus along the pathway by determining vibratory signatures along at least one of the X axis and the Y axis in response to the accelerations and comparing the vibratory signature to a vibratory signature of a commissioning run along the second axis.

14. The sensing system of claim 12, wherein the conveyance system is an elevator system and the conveyance apparatus is an elevator car.

15. The sensing system of claim 14, wherein the inertial measurement unit is located on a header of the elevator car.

* * * * *